Oct. 1, 1957  W. B. CATHEY  2,808,269
TRACTOR STEERING ASSEMBLY WITH MEANS TO RELEASE
THE WHEELS FOR FREE CASTERING MOVEMENT
Filed July 11, 1955  2 Sheets-Sheet 2
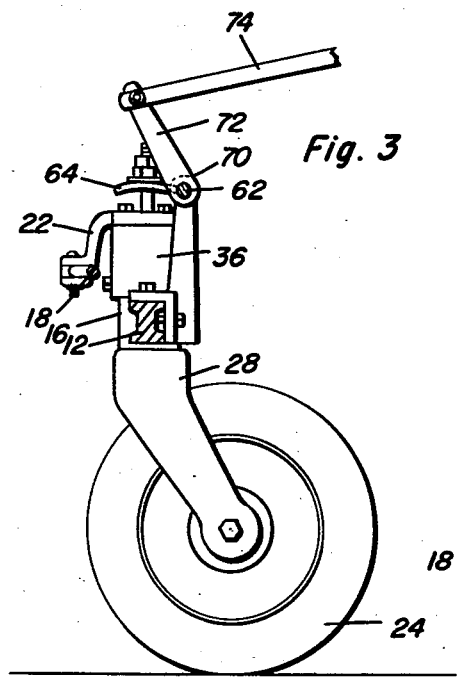
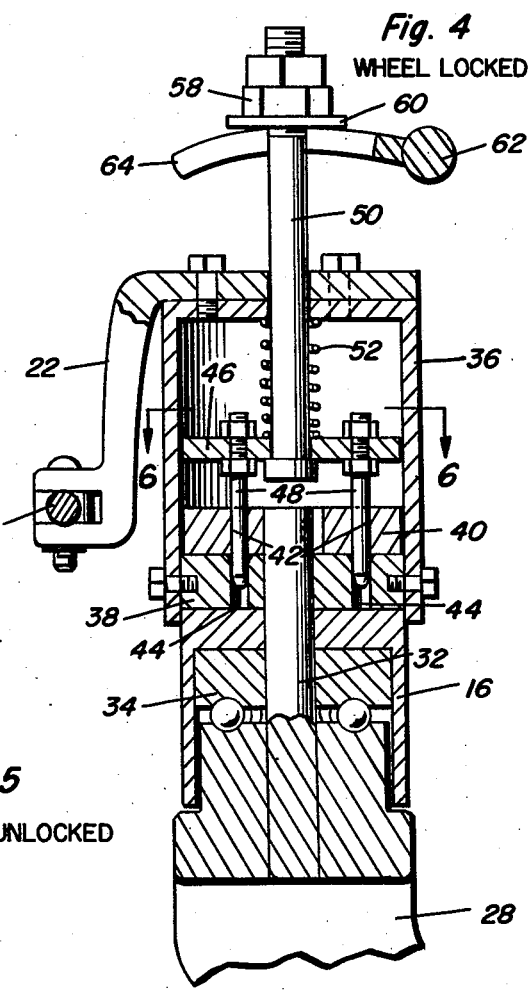
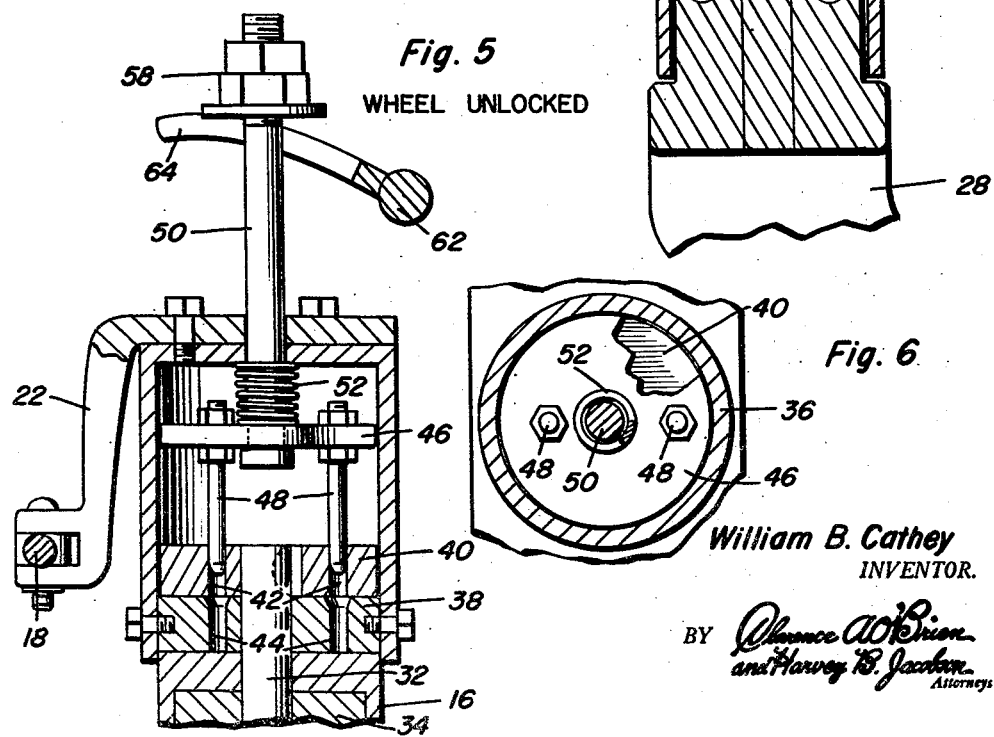
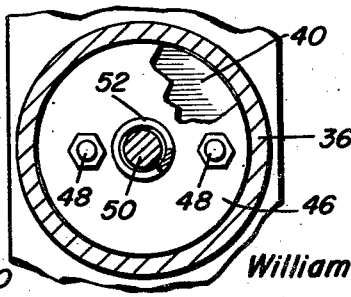
William B. Cathey
INVENTOR.

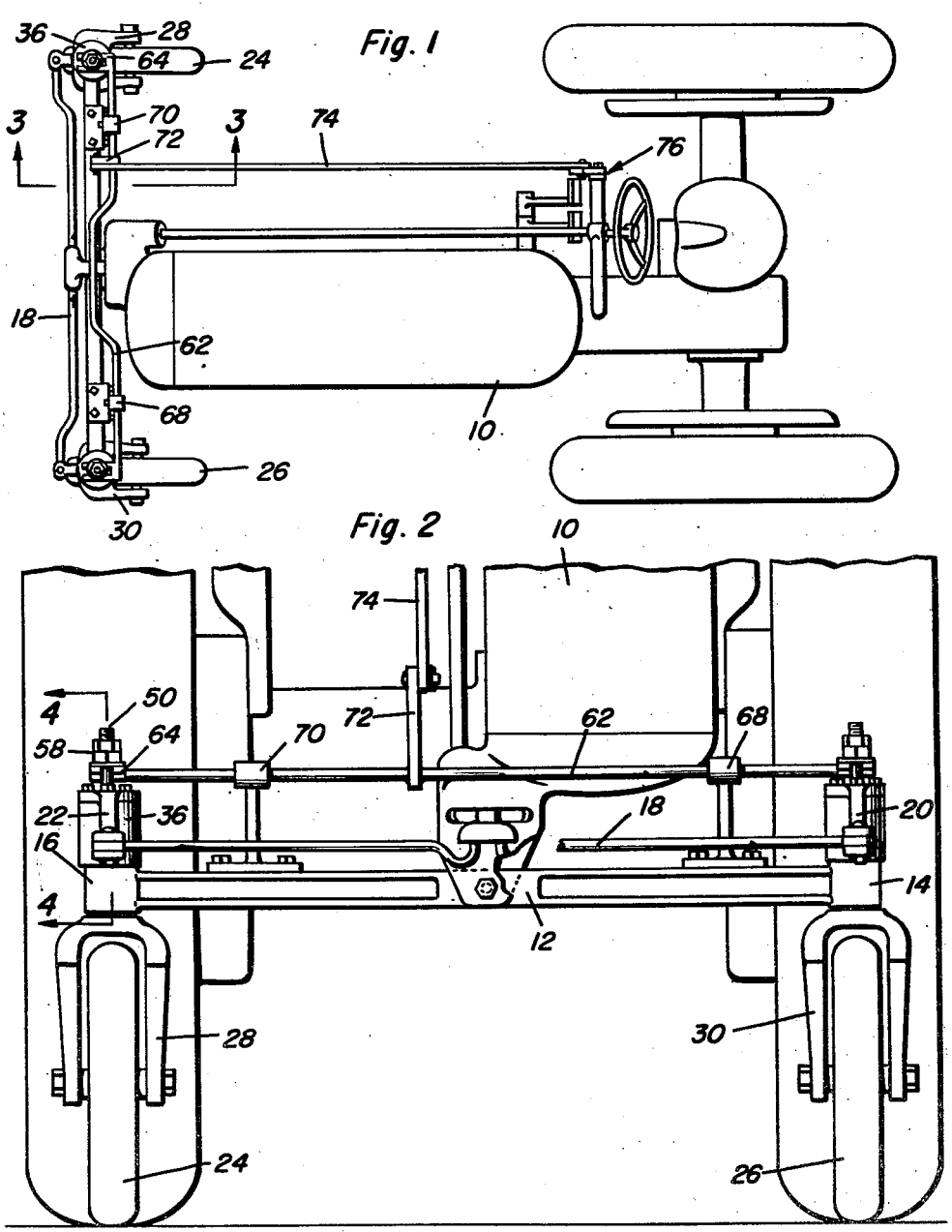
Oct. 1, 1957 — W. B. CATHEY — 2,808,269
TRACTOR STEERING ASSEMBLY WITH MEANS TO RELEASE THE WHEELS FOR FREE CASTERING MOVEMENT
Filed July 11, 1955 — 2 Sheets-Sheet 1
William B. Cathey
INVENTOR.

United States Patent Office 2,808,269
Patented Oct. 1, 1957

2,808,269

TRACTOR STEERING ASSEMBLY WITH MEANS TO RELEASE THE WHEELS FOR FREE CASTERING MOVEMENT

William B. Cathey, Anderson, S. C.

Application July 11, 1955, Serial No. 521,326

6 Claims. (Cl. 280—93)

This invention relates to steering assemblies for tractors, and particularly to a steering assembly which will permit the tractor to be steered in the usual way and by a simple lever operation will free the front wheel spindles from the mechanical steering means for free wheel steering.

An object of this invention is to provide a tractor with a novel steering assembly which separates the front tractor wheel spindles from driving connection with the steering apparatus of the tractor so that these spindles may be free to rotate whereby sharp steering turns may be made by the tractor in applying the rear wheel individual brakes of the tractor in a manner already known in the art.

A more specific object of this invention is to provide an improved front wheel steering and mounting assembly for a tractor, the mounting assembly including a wheel spindle to which a plate is fixed and operable in the steering housing, the steering housing another plate fixed to it and both of the plates having apertures in them into which locking means are adapted to releasably fit. In this way, by separation of the locking means from the apertures, the spindle and hence the wheel carried thereby, is free to rotate in caster fashion, but when the locking pins are in place, the spindle can rotate only by positive action of the steering system of the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of a tractor with the principles of the invention applied thereto;

Figure 2 is a fragmentary front view of the tractor of Figure 1;

Figure 3 is an enlarged sectional view taken on the line 3—3 of Figure 1;

Figure 4 is an enlarged fragmentary sectional view taken substantially on the line 4—4 of Figure 2;

Figure 5 is a fragmentary enlarged sectional view of the structure shown in Figure 4 but showing it in a different position, that is, with the wheel spindle in a released or unlocked condition; and Figure 6 is a transverse sectional view taken on a line 6—6 of Figure 4.

The tractor 10 is essentially of standard construction including individual brakes for the rear wheels, these brakes being individually operable. Among the other structure of the tractor are front axle 12, collars 14 and 16 at the ends thereof, tie rod 18 and steering arms 20 and 22, respectively, at the ends of the tie rod 18. Front wheels 24 and 26 are mounted on axles which are carried by forks 28 and 30, respectively. Fork 28 is identical in structure and function to the fork 30.

Spindle 32 extends from fork 28 and passes through the bearing 34 which is housed within the collar 16. Spindle 32 terminates within the cylindrical steering housing 36 to which steering arm 22 is fixed. The upper end of housing 36 is closed, while the lower end is open but accommodates a plate 38 which is secured to the housing 36 by suitable fastening devices, such as bolts. Plate 38 seats upon the upper surface of collar 16 and a part of the side wall of cylindrical housing 36 also contacts the exterior surface of the collar 16 to aid in maintaining the parts assembled properly and securely.

A plate 40 is disposed in housing 36 and is keyed or otherwise fixed to the spindle 32. Apertures 42 are supplied in the plate 40, while apertures 44 are provided in the plate 38.

Locking means for fastening the plates 38 and 40 together temporarily are provided in the housing 36 but operable from the exterior of the housing. Such locking means consist of a plate 46 having pins 48 depending therefrom, these pins being secured tightly to plate 46. A rod 50 is secured to plate 46 and passes through aligned openings in the top of housing 36 and in the steering arm 22. Spring 52 or an equivalent yielding device is mounted on plate 46 and contacts and reacts on the interior surface of the top of the housing 36. This spring constantly biases the pins 48 toward and into the apertures 42 and 44 in order to couple plates 38 and 40 together. The outer end of rod 50 is threaded and has two or more nuts 58 thereon together with a washer 60. A control rod 62 has a fork 64 which bears against the bottom surface of washer 60. Upon rotation of the rod 62 in one direction, the fork 64 will lift the rod 50, thereby separating the pins 48 from their apertures.

Control rod 62 extends across the front of the tractor, being mounted in tractor supported bearings 68 and 70. This rod is adapted to be rocked by means of a rocker arm 72 fixed to control rod 62 and having linkage 74 connected therewith. The outer end of the linkage 74 has an operating and latching device 76 connected with it.

The spindle supporting and locking means as well as the steering means for the spindle described previously is duplicated, there being one assembly for the wheel 24 and there being a second assembly for the wheel 26. The rod 62 has a fork 64 for one of the assemblies, and at the other end of the rod 62, there is another fork adapted to simultaneously operate with the previously mentioned fork 64.

In normal operation (Figure 4), the steering wheel of the tractor is turned in order to impart lateral motion to the tie rod 18 which is transmitted to rotary movement of housing 36 through the steering arm 22. When housing 36 rotates, plate 38 rotates with it, as do plate 40 and spindle 32 which is keyed to plate 40. This is so in that the pins 42 prevent any relative rotation of plates 38 and 40. When the spindle 32 is rotated, fork 28 which is secured to it also rotates, thereby steering the tractor.

When it is desired to have the front wheels free for steering purposes or for other purposes, the linkage 74 is pulled, thereby rocking the rod 62 and lifting upwardly on the forks thereof. This upward movement of forks, for example, fork 64, elevates the rod 50 (Figure 5) against the yielding opposition of spring 52 in order to separate the pins 42 from the aligned apertures in plates 38 and 40. In this condition, spindle 32 is free to rotate, taking with it the pins 48 and their supporting plate 46 that is rotatable on the rod 50.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A front wheel mounting and steering assembly for free wheel steering and positive mechanical steering for tractors comprising a fork having a spindle extending therefrom, a steering housing, a collar, a plate secured to said steering housing and recessed therein, said plate seating upon said collar, and said collar fitting slightly within said housing to thereby mount said housing on said collar for rotation, a rod extending into said housing, locking means mounted rotatably on said rod, a second plate fixed to said spindle and disposed within said housing, said plates having apertures therein adapted to align, said locking means being engageable with the aligned apertures and separable therefrom by said rod whereby when said locking means holds said plates fixed, said spindle is locked with said housing and is rotatable therewith and when said locking means are separated from said aperture, said spindle is free to rotate with respect to said steering housing.

2. A front wheel mounting and steering assembly for free wheel steering and positive mechanical steering for tractors comprising a fork having a spindle extending therefrom, a steering housing, a collar, a plate secured to said steering housing and recessed therein, said plate seating upon said collar, and said collar fitting slightly within said housing to thereby mount said housing on said collar for rotation, a rod extending into said housing, locking means mounted rotatably on said rod, a second plate fixed to said spindle and disposed within said housing, said plates having apertures therein adapted to align, said locking means being engageable with the aligned apertures and separable therefrom by said rod whereby when said locking means holds said plates fixed, said spindle is locked with said housing and is rotatable therewith and when said locking means are separated from said aperture, said spindle is free to rotate with respect to said steering housing, and yieldable means operatively connected with said locking means constantly biasing said locking means into engagement with said aligned apertures.

3. The subject matter of claim 2 together with a bearing disposed in said collar and mounting said spindle and fork for free rotation.

4. In a tractor having a steering system for mechanically steering the front wheels thereof and selectively freeing the wheels for free wheel steering, said system including steering arms to each of which there is attached a steering housing, the improvement comprising for each steering housing, a spindle having a plate secured thereto and rotatable in said housing, said plate having a plurality of apertures therein, another plate fixed to said housing and having apertures adapted to align with the first mentioned apertures, locking pins adapted to be positioned in said apertures, a rod, means mounting said locking pins on said rod for rotation thereon, said housing having an aperture therein through which said rod extends so as to be accessible from the exterior of said housing whereby said rod may be moved so as to withdraw said pins from the apertures.

5. The combination of claim 4 wherein the tractor has an axle with a collar at one end, the first mentioned plate being seated upon said collar and rotatable thereon in order to support the steering housing, the collar having a central aperture in it through which said spindle extends, a bearing in said collar and mounting said spindle for rotation.

6. The combination of claim 5 together with resilient means yieldingly opposing the operation of said rod in one direction and constantly urging said pin supporting means in such direction as to engage said pins in said aligned apertures.

References Cited in the file of this patent

UNITED STATES PATENTS

| | | |
|---|---|---|
| 2,650,100 | Ronning | Aug. 25, 1953 |
| 2,700,550 | Ronning | Jan. 25, 1955 |